(12) United States Patent
Hong et al.

(10) Patent No.: US 7,535,662 B2
(45) Date of Patent: May 19, 2009

(54) AUTO-FOCUSING CAMERA

(75) Inventors: Chien-Long Hong, Taipei Hsien (TW); Ching-Hsing Huang, Taipei Hsien (TW); Jen-Hung Chung, Taipei Hsien (TW); Huai-Chao You, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 224 days.

(21) Appl. No.: 11/610,669

(22) Filed: Dec. 14, 2006

(65) Prior Publication Data
US 2008/0144197 A1 Jun. 19, 2008

(51) Int. Cl.
G02B 7/02 (2006.01)
(52) U.S. Cl. .................................... 359/819; 359/829
(58) Field of Classification Search ................. 359/819, 359/829
See application file for complete search history.

(56) References Cited
U.S. PATENT DOCUMENTS
7,039,309 B2  5/2006  Hsiao

2004/0165877 A1*  8/2004  Hsiao ........................... 396/85
2006/0193064 A1*  8/2006  Kim ............................ 359/811

FOREIGN PATENT DOCUMENTS
CN  200420083780.2  10/2005

* cited by examiner

Primary Examiner—Jordan M. Schwartz
Assistant Examiner—James C Jones
(74) Attorney, Agent, or Firm—Frank R. Niranjan

(57) ABSTRACT

An auto focusing camera includes a stator (120) and a rotor (130) rotatably disposed in the stator. The stator includes a stator core (122) and at least a coil (125) wound around the stator core. The rotor has an inner thread (136). A lens unit (20) is linearly movably received in the rotor, comprising a lens barrel (14) and a lens (15) mounted in the lens barrel. The lens barrel has an outer thread (146) threadedly engaging with the inner thread of the rotor, and an internal thread (148) formed on an inner surface thereof. The lens has an external thread (158) threadedly engaging with the internal thread of the barrel. When the rotor rotates, the lens unit has a telescopic movement relative to the rotor. By rotating the lens, a relative position between the lens and the lens barrel is adjustable.

16 Claims, 6 Drawing Sheets

AUTO-FOCUSING CAMERA

BACKGROUND OF THE INVENTION

1. Field of the Invention

The present invention relates generally to a lens drive mechanism of an auto-focusing camera, and more particularly to a drive mechanism of an auto-focusing camera with built-in camera lens.

2. Description of Related Art

Usually we need a camera to record memorable moments. The designs of cameras have evolved toward lightweight and compactness, so have the currently popular digital cameras. Conventionally, an auto focus structure is used for controlling the telescopic movement of a lens of the camera.

The auto focus structure of the camera focuses on an object by comparing with the image on an image sensor which is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, the lens stops at the position. In this case, the lens has to be continuously driven back and forth by a stepping motor. The stepping motor includes a cylinder-shaped stator with windings wound thereon, and a rotor received in the stator. The lens is received in the rotor. An internal thread is formed on an inner surface of the rotor, and an external thread screwed on the internal thread is formed on an outer surface of the lens. When a current is applied to the windings of the stator, the rotor is driven to rotate by the interaction of the alternating magnetic field established by the stator and the magnetic field of the rotor. The rotation of the rotor then turns to the axial telescopic movement of the lens through the interaction between the internal thread of the rotor and the external thread of the lens. At the moment when the CPU detects a clearest image as the lens moves back and forth, a stop signal is simultaneously sent to the motor. Therefore, the lens stops at the best focal position (static position).

However, the lens is directly threadedly driven by the rotor of camera; when the clearance of the threaded connection between the lens and the rotor is too large, the lens cannot be precisely driven by the rotor to the intended static position to have the best focus and clearest image. Such a shortcoming needs to be solved.

SUMMARY OF THE INVENTION

According to a preferred embodiment of the present invention, an auto focusing camera includes a stator and a rotor being rotatably disposed in the stator. The stator includes a stator core having a plurality of poles and at least a coil wound around the stator core. The rotor has an inner thread formed on an inner surface thereof. A lens unit is linearly movably received in the rotor, comprising a lens barrel and a lens mounted in the lens barrel. The lens barrel has an outer thread formed on an outer surface thereof and threadedly engaging with the inner thread of the rotor, and an internal thread formed on an inner surface thereof. The lens has an external thread formed on an outer surface thereof and threadedly engaging with the internal thread of the barrel. A relative position between the lens and the lens barrel can be finely adjusted by rotating the lens relative to the lens barrel. When the rotor rotates, the lens together with the lens barrel of the lens unit can have a telescopic movement relative to the rotor.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views.

DETAILED DESCRIPTION OF THE INVENTION

Figure 1:
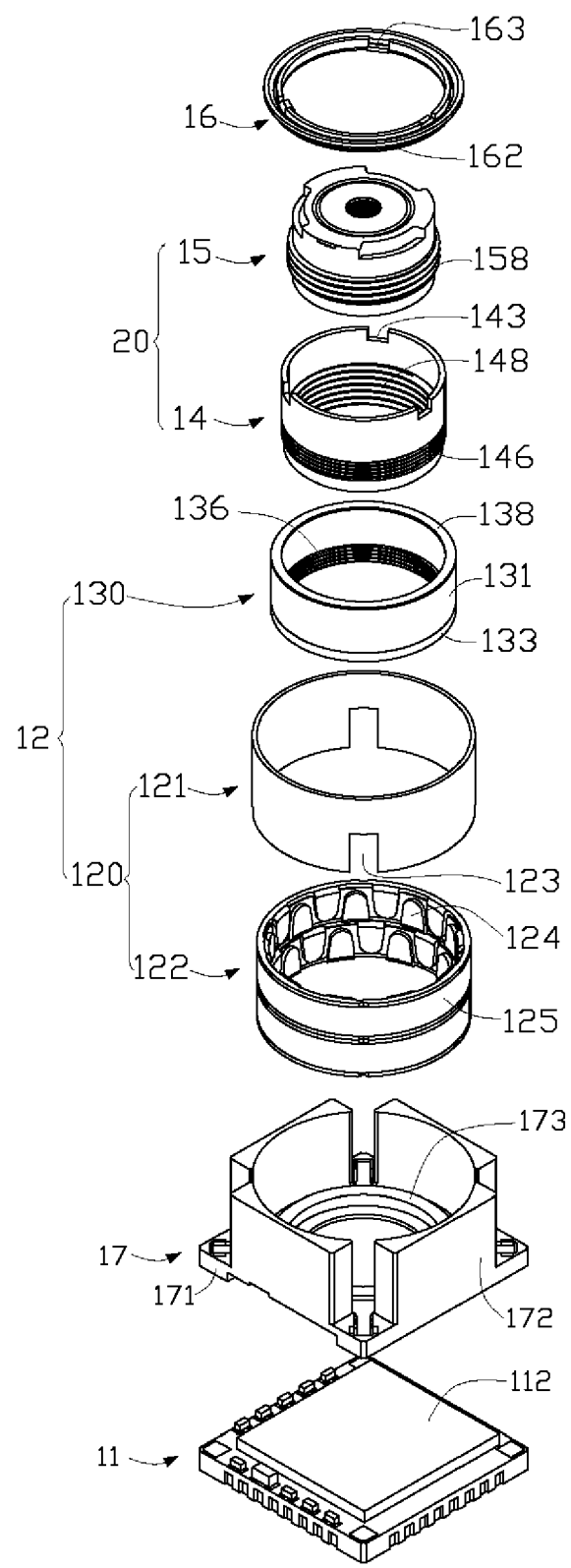
FIG. 1 is an isometric, exploded view of an auto-focusing camera in accordance with a preferred embodiment of the present invention.
Figure 2:
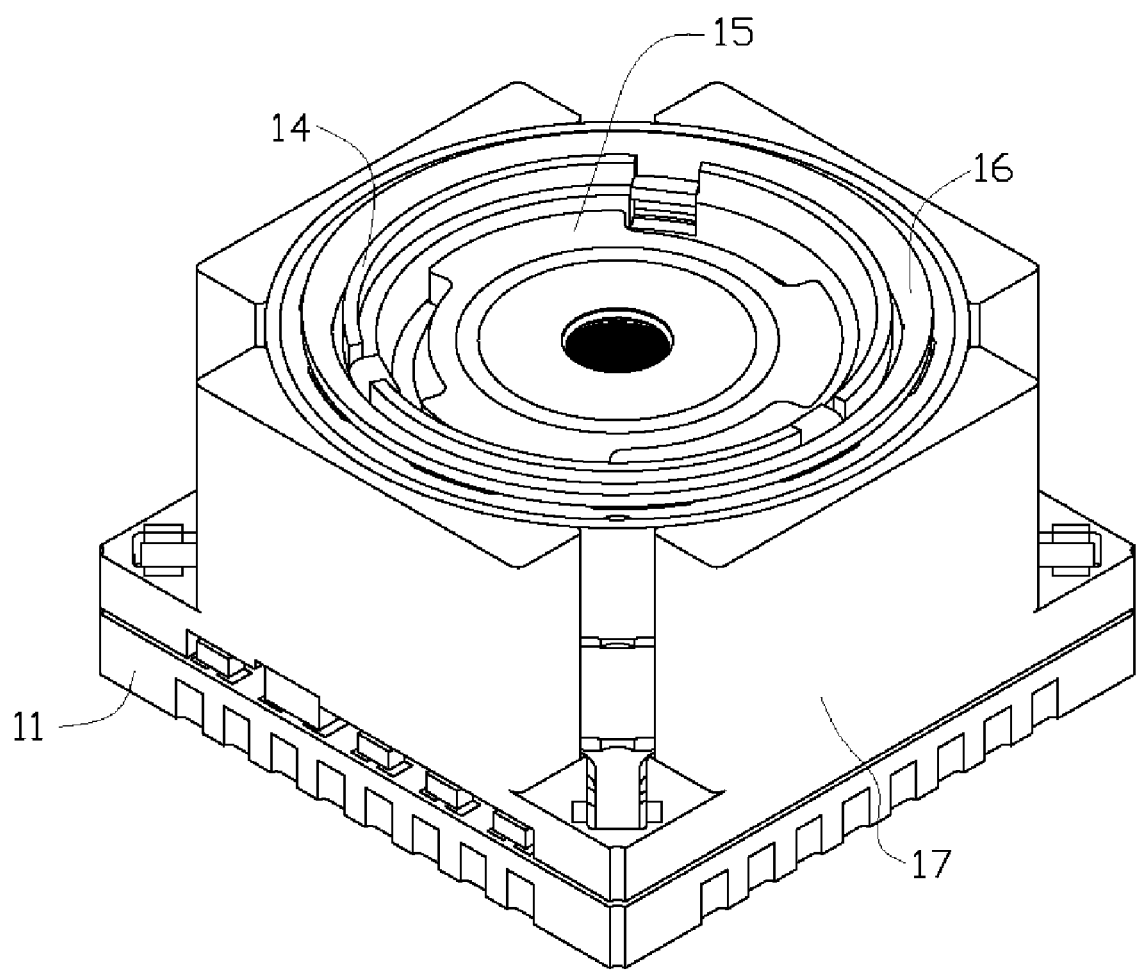
FIG. 2 is an assembled view of FIG. 1.

Referring to FIGS. 1-2, an auto-focusing camera in accordance with a preferred embodiment of the present invention includes a lens mount 17, a lens unit 20 received in the lens mount 17, a stepping motor 12 arranged in the lens mount 17 for driving the lens unit 20 into telescopic movement, and a cover 16 arranged on the motor 12 for guiding the telescopic movement of the lens unit 20. A circuit board 11 is arranged under the lens mount 17, and an image sensor 112 is arranged on the circuit board 11. The image sensor 112 is either a charge coupled device (CCD) sensor, or a complementary metal oxide semiconductor (CMOS) sensor.

Figure 3:
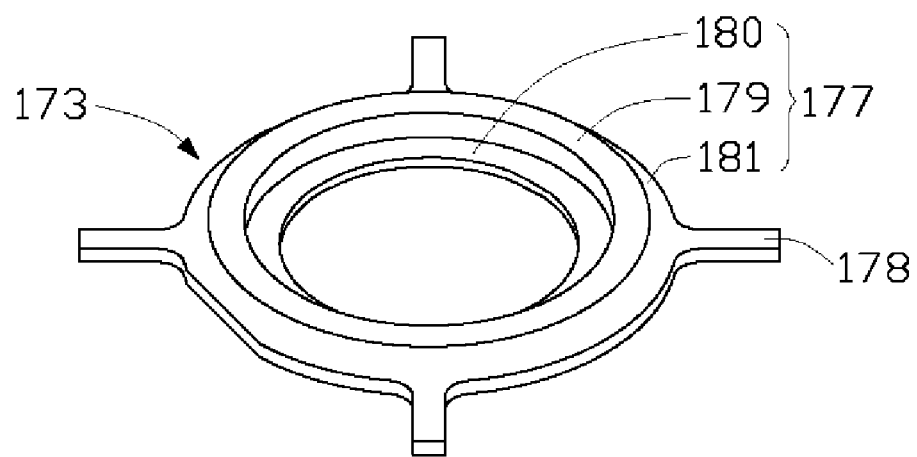
FIG. 3 is an exploded view of a lens mount of the auto-focusing camera of FIG. 1.
Figure 3:
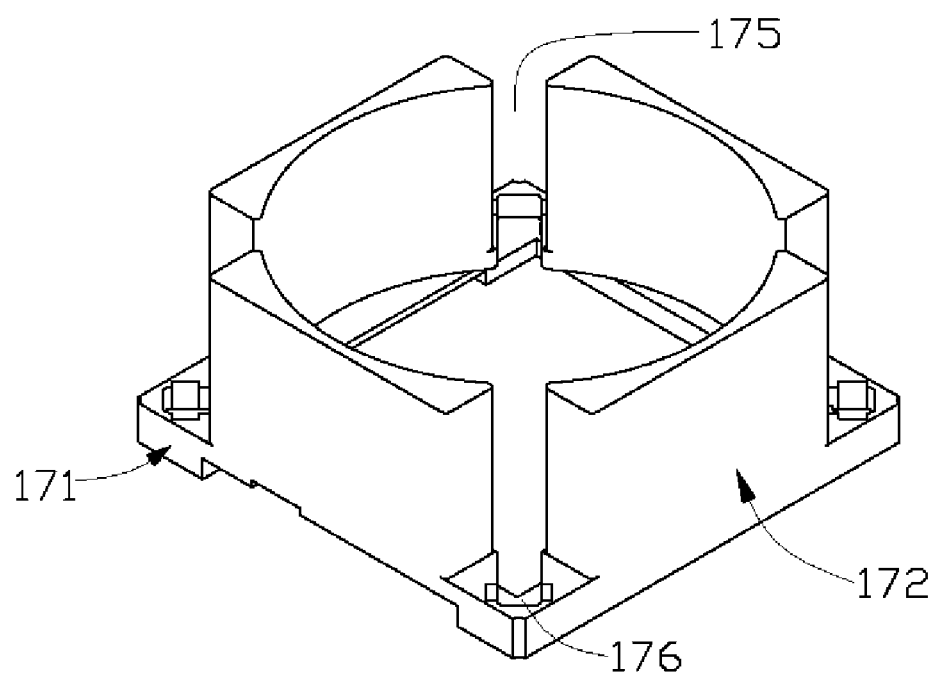

As shown in FIG. 3, the lens mount 17 is cuboid-shaped, and includes a base 171, a sidewall 172, and a bracket 173. The base 171 is square-shaped and defines a square opening (not labeled) therein. The sidewall 172 extends perpendicularly and upwardly from an outer periphery of the base 171. The sidewall 172 defines a column-shaped space (not labeled) for receiving the lens unit 20 and the motor 12 therein. A cutout 175 is defined in each of the four corners of the sidewall 172, and extends through the sidewall 172 to communicate with the column-shaped space. A slot 176 is defined in each corner of the base 171 corresponding to and communicating with the cutout 175 of the sidewall 172. The bracket 173 includes an annular-shaped main body 177 and four protrusions 178 extending radially and outwardly from an outer circumference of the main body 177. Each protrusion 178 extends through a cutout 175 of the sidewall 172 into the slot 176 of the base 171 when the bracket 173 is assembled with the base 171 and the sidewall 172. Alternatively, the bracket 173 can be integrally formed with the base 171 and sidewall 172. The main body 177 of the bracket 173 includes an annular-shaped inner portion 180, an annular shaped outer portion 181 and an annular-shaped middle portion 179 interconnecting the inner and outer portions 180, 181. The middle portion 179 is higher than the inner and outer portions 180, 181 of the bracket 173 in the axial direction.

Figure 4:
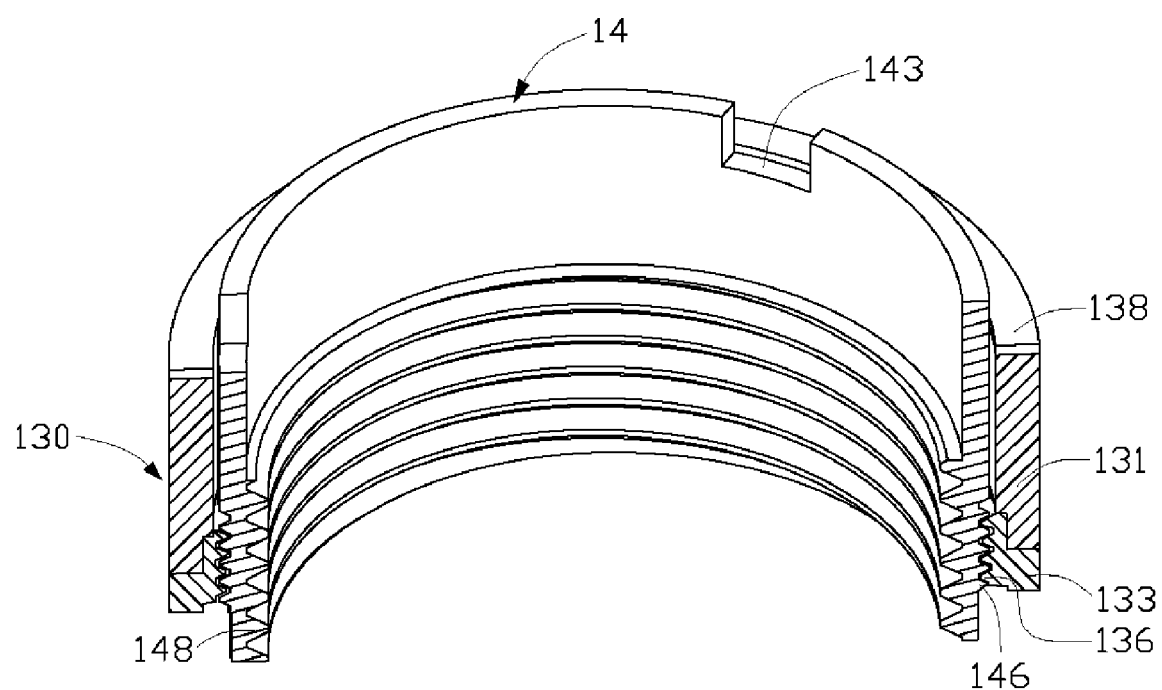
FIG. 4 is an isometric, partly cut-away view of a rotor assembled with a lens barrel of the auto-focusing camera of FIG. 1.
Figure 5:
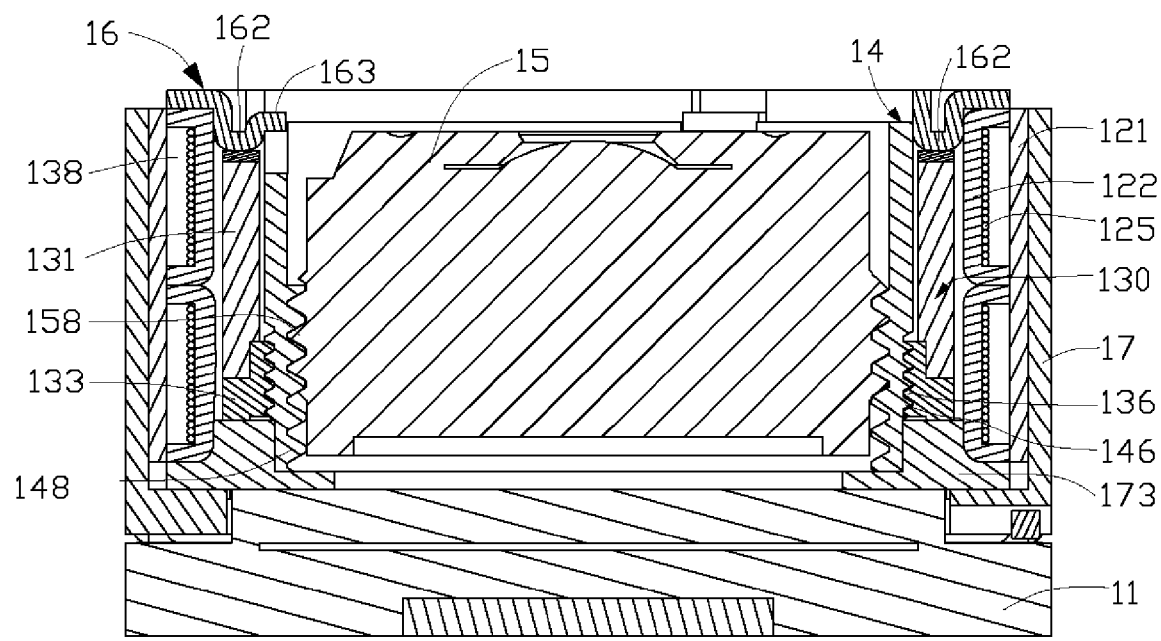
FIG. 5 shows a cross-sectional view of the auto-focusing camera of FIG. 2.
Figure 6:
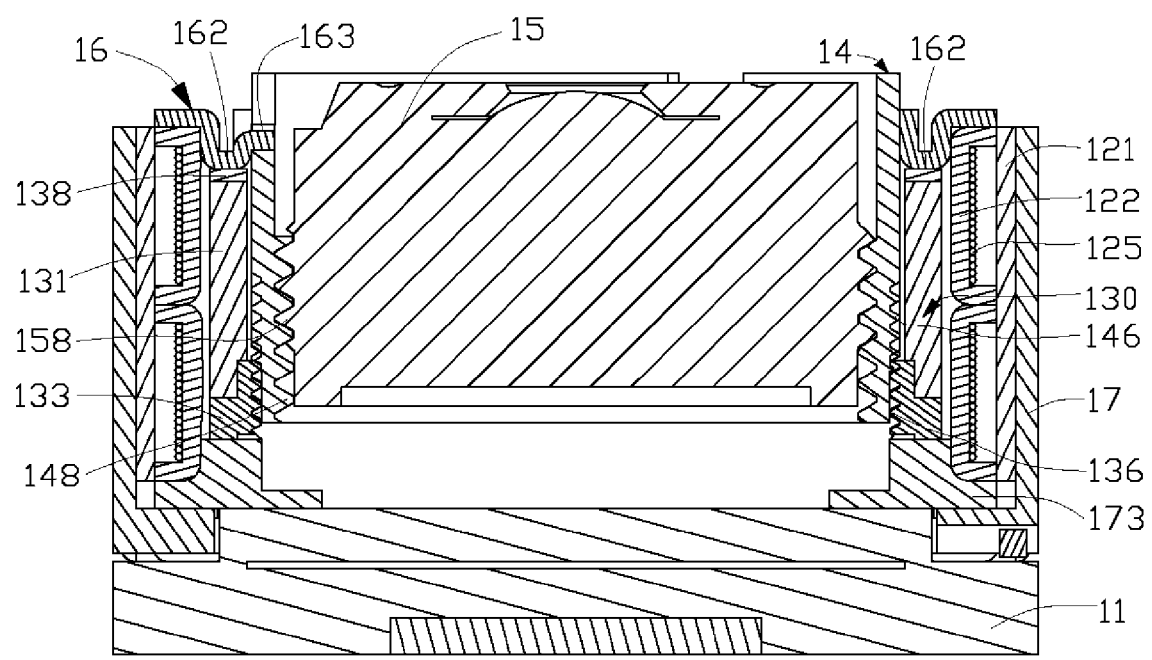
FIG. 6 is similar to FIG. 5, but showing that a lens of the auto-focusing camera is extended.

Referring also to FIGS. 4, 5 and 6, the motor 12 is received in the space of the lens mount 17. The motor 12 is cylindrical-shaped and hollow. An outer diameter of the motor 12 is approximately the same as the inner diameter of the sidewall 172 of the lens mount 17. And an inner diameter of the motor 12 is approximately the same as an outer diameter of the lens unit 20. The motor 12 includes a stator 120 and a rotor 130 being rotatably disposed in the stator 120. The stator 120 includes a stator core 122 and a cylinder 121 mounted around the stator core 122. The stator core 122 has a plurality of poles 124 and coils 125 wound therearound. The cylinder 121 defines a pair of opposite notches 123 near a bottom end thereof for extension of ends of the coils 125 therethrough to connect with the circuit board 11 electrically. The rotor 130 includes a permanent magnet 131 and a cylindrical-shaped shell 133 connected to a bottom end of the magnet 131. The shell 133 forms an inner thread 136 on an inner surface thereof. A layer 138 of high abrasion resistant material, such as ceramic, covers a top end of the magnet 131.

The lens unit 20 is linearly movably received in the rotor 130. The lens unit 20 includes a lens barrel 14 and a lens 15 received in the lens barrel 14. The lens barrel 14 forms an outer thread 146 on an outer surface near a bottom end thereof, corresponding to the inner thread 136 of the shell 133 of the rotor 130. An internal thread 148 is formed in an inner surface of the lens barrel 14. An external thread 158 is formed in an outer surface of the lens 15 to threadedly engage with the internal thread 148 of the lens barrel 14. Three grooves 143 are defined in a top end of the lens barrel 14 of the lens unit 20. The grooves 143 are equidistantly spaced from each other along a circumferential direction of the lens barrel 14.

The cover 16 is mounted on the rotor 130 and has a ring 162 extending downwardly thereof abutting against the top end of the rotor 130. Three ears 163 extend radially and inwardly from an inner circumference of the cover 16 corresponding to the grooves 143 of the lens barrel 14.

As shown in FIG. 5, when assembled, the motor 12 is received in the lens mount 17. The lens 15 is received in the lens barrel 14 with the external thread 158 threadedly engaged with the internal thread 148 of the lens barrel 14 to assemble the lens unit 20 together. The lens unit 20 is then received in the hollow motor 12 with the outer thread 146 of the lens barrel 14 screwing on the inner thread 136 of the shell 133 of the rotor 130. Also the lens barrel 14 can be firstly mounted into the motor 12, and then assembled with the lens 15. Thus assembling of the lens unit 20 can be conveniently completed. Furthermore, after the lens unit 20 is assembled in the motor 12, a relative position between the lens 15 and the lens barrel 14 can be finely adjusted by rotating the lens 15 relative to the lens barrel 14 until the lens 15 reaches its intended initial position precisely, thereby to improve the positional precision of the lens unit 20 after it is assembled to the auto-focusing camera. When the motor 12 and the lens unit 20 are mounted into the lens mount 17, the stator 120 and the rotor 130 of the motor 12, and the lens unit 20 are respectively located on the outer, middle and inner portions 181, 179, 180 of bracket 173 of the lens mount 17. The cover 16 is arranged on the motor 12 with the ring 162 abutting the top end of the rotor 130 and the ears 163 engaging into the grooves 143 of the lens barrel 14. The ends of the coils 125 of the stator 120 extend through the notches 123 of the cylinder 121 and are electrically connected with the circuit board 11 arranged under the lens mount 17.

Referring to FIG. 6, during operation, a current is applied to the coils 125 of the motor 12. The rotor 130 is driven to rotate by the interaction of the alternating magnetic field established by the stator 120 and the magnetic field of the rotor 130. The rotation of the rotor 130 then turns to the axial telescopic movement of the lens unit 20 through the interaction between the inner thread 136 of the rotor 130 and the outer thread 146 of the lens barrel 14 and the ears 163 and the grooves 143. Therefore the motor 12 acts as a stepper motor 12 to drive the lens unit 20 into telescopic movement along the axial direction of the lens unit 20. By means of the external and internal threads 158, 148 formed on the lens 15 and the lens barrel 14, the position of the lens 15 can be easily and precisely adjusted to the required initial position. Furthermore, the ring 162 of the cover 16 abuts the top end of the rotor 130 to limit the axial movement of the rotor 130. The ears 163 of the cover 16 engage with the grooves 143 of the lens barrel 14 to avoid swing of the lens unit 20, and to guide the axial movement of the lens unit 20. Thus, a stable and precise axial movement of the lens unit 20 can be obtained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auto-focus camera comprising:
   a stator comprising a stator core having a plurality of poles and at least a coil wound around the stator core;
   a rotor being rotatably disposed in the stator, having an inner thread formed on an inner surface thereof; and
   a lens unit being linearly movably received in the rotor, comprising a lens barrel and a lens mounted in the lens barrel, the lens barrel having an outer thread formed on an outer surface thereof and engaging with the inner thread of the rotor, and an internal thread formed on an inner surface thereof, the lens having an external thread formed on an outer surface thereof and engaging with the internal thread of the barrel;
   wherein when the rotor rotates, the lens barrel together with the lens has a linearly telescopic movement relative to the rotor, and wherein a relative position between the lens and the lens barrel is adjustable by rotating the lens relative to the lens barrel; and
   wherein the rotor comprises an annular shell and an annular permanent magnet secured on the shell, an outer circumferential surface of the shell has a diameter substantially equal to that of an outer circumferential surface of the permanent magnet, and the inner thread of the rotor is formed on an inner circumferential surface of the shell.

2. The auto-focus camera of claim 1, further comprising a cover arranged on the motor, the cover having a plurality of ears extending radially and inwardly from an inner circumference thereof, the lens barrel defining a plurality of grooves receiving the ears therein.

3. The auto-focus camera of claim 2, wherein the cover comprises an outer planar portion, an outer vertical portion extending downwardly and perpendicularly from an inner periphery of the outer planar portion, an inner planar portion extending inwardly and horizontally from a bottom end of the outer vertical portion, and an inner vertical portion extending upwardly and perpendicularly from an inner periphery of the inner planar portion, the ears extending from the inner vertical portion of the cover, the inner planar portion abutting a top end of the magnet of the rotor, and the outer planar portion abutting a top end of the stator of the motor.

4. The auto-focus camera of claim 3, wherein a layer of high abrasion resistant material covers the top end of the permanent magnet, the inner planar portion abutting the layer of high abrasion resistant material.

5. The auto-focus camera of claim 1 further comprising a lens mount having a base defining an opening therein, and a sidewall extending upwardly from a periphery of the base, the sidewall defining a space receiving the rotor, the stator and the lens unit therein, a bracket being arranged in the space supporting the rotor, the stator and the lens unit thereon.

6. The auto-focus camera of claim 5, wherein the base is square-shaped and defines a slot in each corner thereof, and the sidewall defines a cutout in each corner thereof corresponding to and communicating with the slot of the base, the bracket having an annular-shaped main body received in the space and four protrusions extending through the cutouts of the sidewall into the slots of the base, respectively.

7. The auto-focus camera of claim 6, wherein the main body of the bracket comprises an annular inner portion, an annular outer portion and an annular middle portion higher than and interconnecting the inner and outer portions, the lens unit, the rotor and the stator being respectively arranged on the inner, middle and outer portions of the bracket.

8. The auto-focus camera of claim 5, wherein the bracket is integrally formed with the base and sidewall.

9. The auto-focus camera of claim 1, further comprising a circuit board with an image sensor arranged thereon, the circuit board being arranged under the stator and the lens unit, and the circuit board being electrically connected with the stator.

10. An auto-focus camera, comprising:
a lens mount;
a lens unit received in lens mount, comprising a lens barrel and a lens mounted in the lens barrel, the lens barrel having an outer thread formed on an outer surface and an internal thread formed on an inner surface thereof, the lens having an external thread formed on an outer surface thereof and engaging with the internal thread of the barrel;
a stepping motor being received in an interspace defined between the lens unit and the lens mount, the stepping motor comprising a stator and a rotor being rotatably received in the stator, the rotor comprising an annular shell and an annular permanent magnet secured on the shell, an outer circumferential surface of the shell having a diameter substantially equal to that of an outer circumferential surface of the permanent magnet, an inner circumferential surface of the shell defining an inner thread engaging with the outer thread of the lens barrel, during operation of the motor, a rotation of the rotor turning to an axial telescopic movement of the lens unit through an interaction between the inner thread of the rotor and the outer thread of the lens barrel; and
a cover arranged on the rotor and interacting with the lens barrel for guiding the telescopic axial movement of the lens unit;
wherein a position of the lens relative to the lens barrel is adjustable by rotating the lens relative to the lens barrel.

11. The auto-focus camera of claim 10, wherein the cover comprises a plurality of ears extending radially and inwardly from an inner circumference thereof, and the lens barrel defines a plurality of grooves receiving the ears therein.

12. The auto-focus camera of claim 10, wherein the lens mount comprises a bracket supporting the motor and lens unit thereon.

13. The auto-focus camera of claim 12, wherein the lens mount further comprises a base defining an opening therein, and a sidewall extending upwardly from a periphery of the base, the sidewall defining a space receiving the rotor and stator therein, the base being square-shaped and defining a slot in each corner thereof, the sidewall defining a cutout in each corner thereof corresponding to the slot of the base, the bracket having an annular-shaped main body supporting the motor and the lens unit thereon and four protrusions extending from the main body through the cutouts of the sidewall into the slots of the base, respectively.

14. The auto-focus camera of claim 4, wherein the layer of high abrasion resistant material is ceramic.

15. The auto-focus camera of claim 2, wherein the grooves are defined in a top end of the lens barrel, and each groove extends through the lens barrel in a radial direction of the lens barrel.

16. The auto-focus camera of claim 1, wherein a top end of the shell is step-shaped, and a bottom end of the magnet is step-shaped matingly engaging with the step-shaped top end of the shell.

* * * * *